May 21, 1935.  H. L. PETTEYS  2,001,921
LAWN EDGER
Filed Aug. 26, 1932
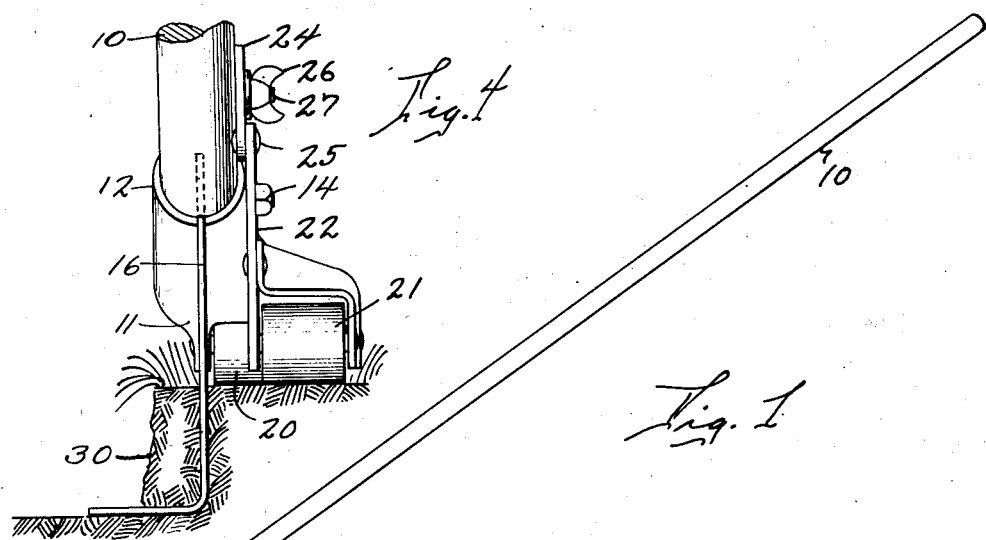
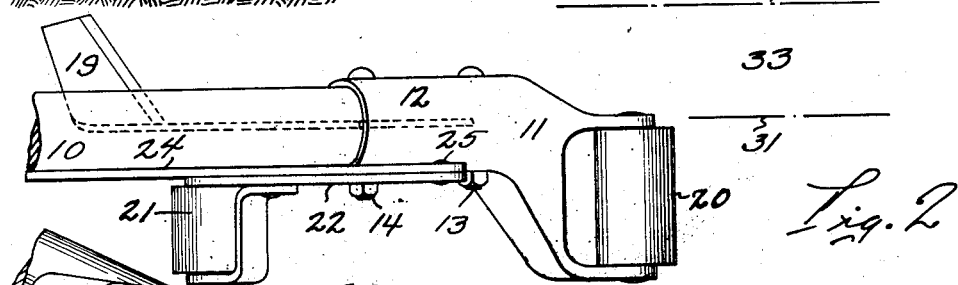
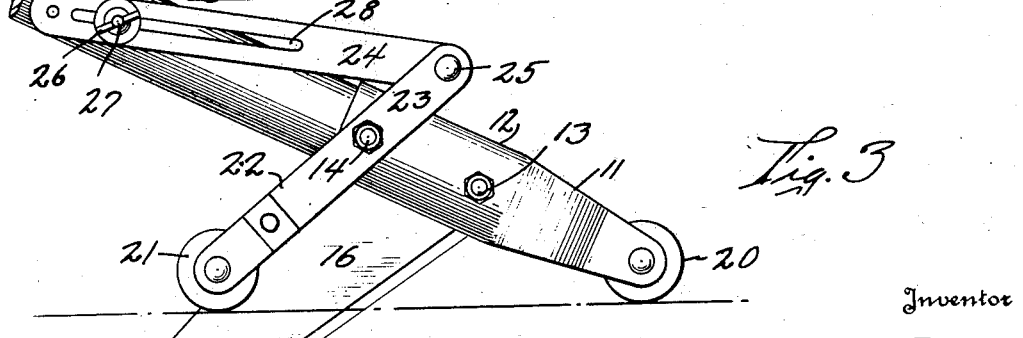
Inventor
Howard L. Petteys
By Lynn H. Latta
Attorney Patented May 21, 1935

2,001,921

UNITED STATES PATENT OFFICE 2,001,921

LAWN EDGER

Howard Lester Petteys, Perrysburg, Ohio

Application August 26, 1932, Serial No. 630,504

2 Claims. (Cl. 97—227)

This invention relates to lawn edgers and has for its object to provide an edger of simple and relatively inexpensive construction, capable of making a clean vertical cut along the edge of a lawn bordering a flower bed, side walk, or the like, without leaving uncut sod overhanging the cut shoulder, capable of cutting a smooth, vertical sided trench of limited width, in an unbroken sodded surface, provided with means to facilitate the travel of the device, possessed of novel adjustable means for determining the depth of cut, and so constructed that the resistance of the sod being cut to the passage of the blade of the device therethrough, will produce a minimum side draft in the blade.

With these and other objects in view my invention consists in the combination and construction and arrangement of the various parts thereof, whereby the objects contemplated are attained, as more fully set forth in the accompanying specifications, pointed out in my claims, and illustrated in the accompanying drawing, in which:

Fig. 1 is a side elevation of the device, a strip of sod being operated upon, being shown in section.

Fig. 2 is a plan view of the same.

Fig. 3 is a side elevation of the other side of the device, and

Fig. 4 is a rear elevation of the device in operation upon a shouldered edge of a lawn.

I provide a handle shaft 10 on the lower end of which is mounted a roller bracket 11. A socket 12, part of the bracket 11, receives the shaft 10 and is secured thereto by bolts or pins 13, 14 extending therethrough.

A slot in the handle shaft 10 receives the upper end of a blade 16, the forward or cutting edge of which is inclined downwardly and rearwardly (toward the rear end of the handle shaft). The bolts 13, 14 extend through the blade 16 and serve to attach it to the handle shaft. The lower end of the blade is bent, along a line 18, forming an angle of about 140° with the edge 17, to form an extension 19, lying perpendicular to the plane of the blade 16. The latter plane intersects the handle shaft axis.

The bracket 11 comprises two spaced arms between which is journalled the forward ground roller 20. The diameter of the latter is substantially 1⅛". The axis of the roller 19 is perpendicular to the plane of blade 16. The bracket 11 is offset toward the right, as viewed from behind, so as to position the roller to the right of the vertical plane of the blade 16. The extension 19 lies on the left side of said plane.

The rear ground wheel 21, is journalled upon an arm 22, pivoted on the bolt 14, and extended therebeyond as at 23. A link 24 is pivoted at one end as at 25 to the extended arm portion 23, and secured to the handle shaft 10 by means of a thumb nut 26, threaded upon a bolt 27, secured in the handle shaft and extended through a slot 28 in the link 24.

By shifting the link 24 the angle of the arm 22 may be varied and the position of the roller 21 relative to the handle may be varied in such a way as to allow the device to ride on the two rollers at any of a plurality of various positions of angularity between the handle shaft and the ground, thereby varying the depth at which the blade 16, 19, will cut.

In using the device, the handle shaft is grasped in the two hands of the operator and the tool is pushed forwardly along a shouldered lawn edge 30 to be trimmed, (Fig. 4) the blade 16 depending vertically, the rollers 20, 21, travelling along the surface of the sod adjacent the edge, and the extension 19 travelling along the bottom of the trench or unsodded portion of the ground adjacent the shouldered edge 30.

The inclination of the edge 17 is such that the blade 16 will slice downwardly, making a clean cut at the surface, and leaving no overhanging fringe of grasses and rootlets, such as occurs in devices that employ a vertical or rearwardly and upwardly inclined edge.

The blade 16 is relatively narrow and is supported from above so that only the slight resistance of the lower end of the blade to travel through the sod, need be overcome in pushing the device.

The two wheels determine the depth of cut so the operator may bear down without fear of varying the depth of cut.

The space behind the portion of the blade that enters the soil is clear so that an extended cut may be made in an unbroken stretch of sod without difficulty and without breaking the sod above the extension 19 except for the plane of cleavage of the blade 16 (as indicated by line 31, Fig. 2.) The operator may then lift the blade from the soil, reverse the instrument, and cut along a line 32 parallel to the cut 31 and spaced therefrom the width of blade extension 19, whereby a continuous ribbon of sod 33 may be removed, leaving a trench with clean cut sides and bottom. The ability to remove the ribbon 33 in unbroken form, makes for a clean operation with no loose particles of soil to be cleaned up. This operation is particularly useful in trenching along a sidewalk where the sod has previously been allowed to grow up to the edge of the walk. It is also useful in laying out flower beds, etc.

The small diameter of the roller 20 cuts the side draft on the blade 16 to a minimum, by bringing the line of contact between the roller and the ground almost into intersection with the axis of the handle shaft. The length of the roller 20 being greater than its diameter, downward pressure on the handle will serve to avoid tilting of the device under side draft from the blade.

I claim as my invention:

1. In a lawn edger, a handle shaft, a roller journalled on the forward end thereof, a blade depending from the shaft parallel to the plane of the shaft axis and perpendicular to the axis of the roller, said blade having a forward cutting edge, a rear roller mounted below the handle shaft and rearwardly of said forward roller, an arm on the end of which said rear roller is mounted, said arm being pivoted intermediate its ends on the shaft, a link pivoted to the other end of the arm, and an adjustable connection between said link and the shaft, said arm extending downwardly and rearwardly and said link movable longitudinally alongside said handle.

2. In a lawn edger, a handle shaft the lower end of which has an axial slot, a blade received in said slot and projecting downwardly, roller bracket means in engagement with the lower end portions of the shaft, securing elements extending through said lower end portions of the shaft, through said blade, and through said bracket means, and a roller mounted in said bracket means forwardly of the shaft on an axis perpendicular to the plane of said blade and offset laterally of said plane so that one end of the roller substantially coincides with said plane.

HOWARD LESTER PETTEYS.